Dec. 31, 1968 H. HANY ET AL 3,418,859

SPINDLE PRESS

Filed May 16, 1966 Sheet 1 of 3

Harald Hany
Volker Stille
INVENTORS.

BY

Karl F. Ross
Attorney

Harald Hany
Volker Stille
INVENTORS.

BY
Karl G. Ross
Attorney

Harald Hany
Volker Stille
INVENTORS.

BY

Karl F. Ross
Attorney

United States Patent Office 3,418,859

Patented Dec. 31, 1968

3,418,859
SPINDLE PRESS

Harald Hany and Volker Stille, Kassel-Wilhelmshohe, Germany, assignors to Firma Franz Berrenberg, a corporation of Germany Filed May 16, 1966, Ser. No. 550,208
Claims priority, application Germany, Oct. 16, 1965, B 84,134
4 Claims. (Cl. 74—199)

ABSTRACT OF THE DISCLOSURE

A spindle press in which a driven disk is reversibly rotated with a pair of driving disks mounted on a transverse shaft for alternate frictional entrainment of the driven disk and in which the driven disk has a hub mounted on the spindle and an annular body detachably engaging the hub via co-operating frustoconical outer and inner surfaces of the hub and body, the contact between these surfaces being maintained by coupling means (e.g. an array of bolts surrounding the hub or a central bolt passing through the spindle) bearing axially on the hub and body so as to urge them into firmer peripheral engagement at the frustoconical surfaces.

Our present invention relates to a spindle press of the type wherein a spindle, rotatably mounted (usually in vertical position) on a press frame, can be reversibly driven with the aid of a pair of driving disks mounted on a transverse (usually horizontal) shaft for alternate frictional entrainment of a driven disk rigid with the spindle. This arrangement prevents overstraining of the spindle and its driving mechanism since the frictional coupling between the disks will slip in the event of an overload.

The general object of our invention is to provide an improved construction of the driven disk whereby the latter can be removably secured to the spindle in a manner enabling the transmission of large torques from the disk to the spindle.

A more particular object of our invention is to provide a disk construction which, while satisfying the aforestated requirement, is compact and of low weight to minimize the moment of inertia of the spindle assembly so that the spindle can quickly come to a halt in response to severe stresses.

In accordance with the present improvement, the driven disk is divided into at least two parts, i.e. a hub mounted directly on the spindle and an annular body detachably engaging the hub through the intermediary of co-operating frustoconical outer and inner peripheral surfaces of the hub and the body, the contact between these surfaces being maintained by coupling means bearing axially upon the two parts so as to tend to shift them into firmer peripheral engagement.

The hub itself may be subdivided into a fixed portion seated on the spindle head and a ring carried on a peripheral flange of that portion, the ring being axially movable with reference to the flange and bearing the frustoconical outer hub surface which engages a mating inner surface of the annular body. With that body resting against the flange of the hub, the coupling means may comprise a circular array of axially extending screws which interconnect the flange and the ring so as to clamp the annular body between these elements.

It is, however, also possible to make the hub in one piece and to anchor the coupling means directly to the spindle, advantageously in the form of a pressure element which is secured by a tension rod or the like, under axial stress, to the spindle head so as partly to overlie the annular body and to exert axial pressure upon same. Particularly in this case it will be desirable, according to a further feature of this invention, to provide the hub with a frustoconical bore engaging a corresponding surface of the spindle head, the generatrices of the frustoconical head converging on the same side of the annular disk body as the generatrices of the aforementioned interengaging inner and outer peripheral surfaces, i.e. at a point beyond the spindle along its axis, whereby the pressure of the coupling element will serve simultaneously to maintain the annular disk body in firm contact with the hub and to hold the hub in tight engagement with the spindle head.

The invention will be described in greater detail hereinafter, reference being made to the accompanying drawing in which.

Figure 1:
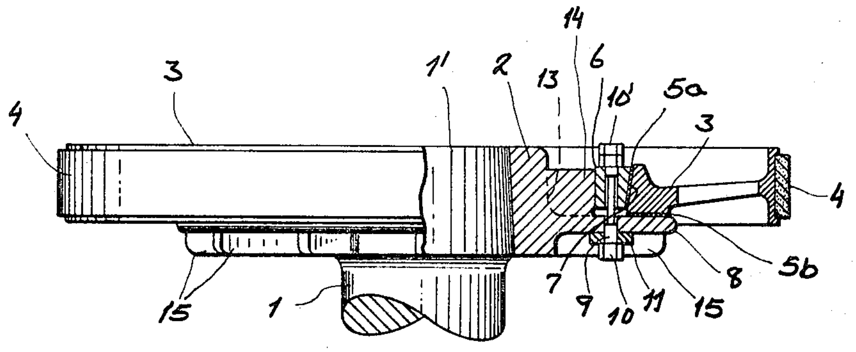
FIG. 1 is a side-elevational view, partly in section, of a spindle head bearing a driven disk embodying the present improvement.
Figure 2:
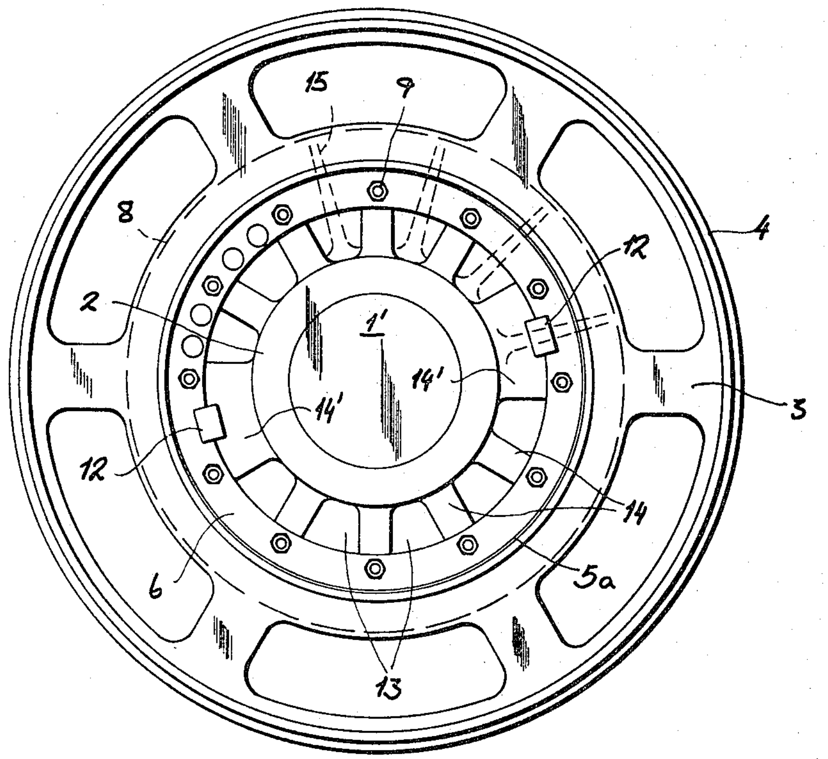
FIG. 2 is a top view of the assembly shown in FIG. 1.

Reference will first be made to FIGS. 1 and 2 which showing the top of a spindle 1 whose frustoconical head 1' supports a hub 2 of a driven disk which also includes an annular body 3; the mounting of the spindle and the co-operation of the disk 2, 3 with a pair of alternately effective driving disks has not been illustrated in these figures but is shown in detail in the embodiment of FIGS. 3 and 4. Disk body 3 is provided along its outer periphery with a friction lining 4 and is separated by a pair of friction layers *5a* and *5b* from a radial flange 8 of hub 2 and from a clamping ring 6 secured to this flange by a circular array of screws 9 having heads 10 and nuts 10'. Spring washers 11 are inserted between the flange 8 and the heads 10.

Ring 6 has an outer peripheral surface 7 of frustoconical shape which engages a confronting inner surface of body 3 through the intermediary of layer *5a*, it being understood that this layer may be cemented onto either of these surfaces even as layer *5b* may be secured to the undersurface of body 3 or the upper face of flange 8. The inner surface of ring 6 is cylindrical and slides against a set of radial teeth 14 which are integral with hub 2 and form spacers between the latter and the ring 6.

It will be apparent that a tightening of the nuts 10' on screws 9 firmly clamps the disk body 3 between the ring 6 and the flange 8 by virtue of the frustoconical surface 7 of ring 6 and the co-operating surface of body 3. Two of the radial teeth of hub 2, designated 14', are wider than the others and are formed with peripheral recesses to accommodate a pair of keys 12 which also enter confronting recesses in the inner surface of ring 6 to provide a positive connection between the ring and the hub, thereby relieving the screws 9 of excessive strain.

In order to minimize the moment of inertia of the assembly shown in FIGS. 1 and 2, the spaces 13 separating the teeth 14 are advantageously somewhat wider than these teeth, as shown in FIG. 2; also, the flange 8 should have a thickness which is only a small fraction of the axial extent of hub 2, this flange being reinforced along its underside by a set of radial ribs 15.

Figure 3:
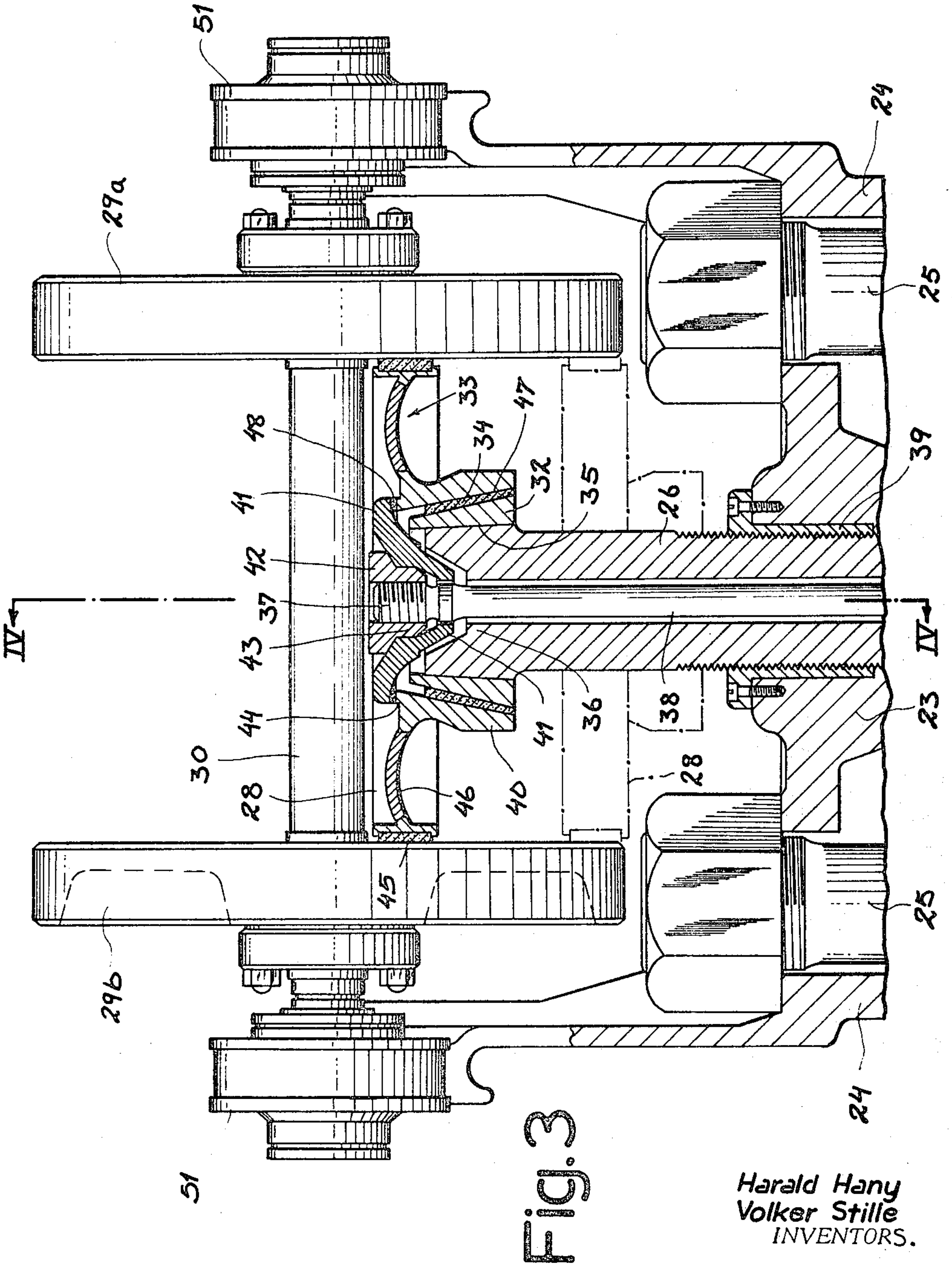
FIG. 3 is a view generally similar to FIG. 1 but showing, in combination with a modified driven disk, additional parts of the press including a pair of associated driving disks mounted on the press frame, this view being taken in section on the line III—III of FIG. 4.
Figure 4:
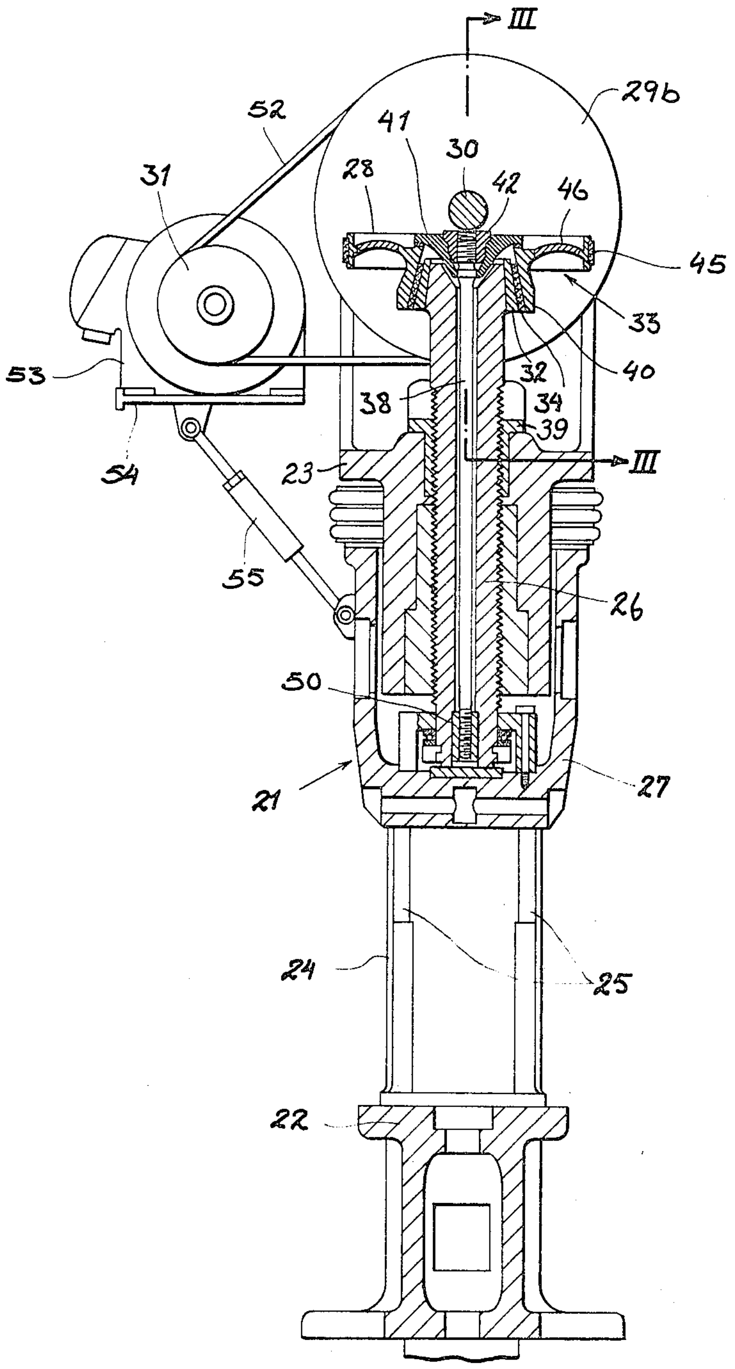
FIG. 4 is a cross-sectional view of the entire press, taken on the line IV—IV of FIG. 3.

Reference will now be made to FIGS. 3 and 4 which show a generally similar assembly on a press frame 21 having a bed 22 underneath a beam 23 wherein the spindle 26 is vertically slidable. The beam 23 is rigid with a pair of lateral uprights 24 of the press frame and supports a sleeve 39 threadedly engaging the spindle 26, this sleeve being nonrotatably mounted on the beam so that the spindle reciprocates vertically upon being rotated in one direction or the other. The lower end of the spindle is journaled in a ram 27 which is slidably but nonrotatably guided by a pair of vertical rods 25 extending alongside the uprights 24.

The head 36 of spindle 26 has a frustoconical peripheral surface 35 fitting into an upwardly converging bore of a hub 32 forming part of a driven disk 33, this disk also including an annular body 28 with a central portion 40 which is generally similar to hub 32 in that the generatrices of its frustoconical inner peripheral surface 47 converge in the same direction as those of the inner hub surface, i.e. toward a point on the spindle axis located above the head 36. This surface 47 is maintained in contact with a confronting outer peripheral surface of hub 32, through the intermediary of a friction layer 34 secured (for example) to surface 47, by a generally cup-shaped pressure element 41 whose outturned rim overlies the central body part 40 of disk 33. A thin annular rib 44, rising from part 40 to a height which is a small fraction of the axial extent of hub 32, is engaged through a friction layer 48 by the rim of element 41 which in turn is urged axially downwardly by a nut 42 threadedly gripping a terminal 37 of a tension rod 38 which traverses the spindle 26 in axial direction, the nut 42 having a cylindrical shank 43 slidably fitting into an upper recess of element 41. A nipple 50 (FIG. 4) is threadedly attached to the lower end of rod 38 and engages an internal shoulder in the spindle bore for enabling adjustment of the stress exerted upon the pressure element 41 and, thereby, upon the annular disk body 28. The axial pressure thus transmitted to body 28 firmly urges the part 40 into frictional contact with hub 32 and, at the same time, holds the latter in position on the head 36.

Motion is imparted to the disk 33 by its peripheral engagement with either of two driving disks **29*a*, 29*b* fixed to a shaft 30 which is journaled in bearings 51 atop uprights 24 with freedom of limited axial displacement, under the control of a reversing mechanism not further illustrated, the disk 29*a* being linked by a belt 52 with a pulley 31 on a drive motor 53 whose mounting platform 54 can be swung away from the press frame 21 by a hydraulic jack 55 to tension the belt. It will be apparent that the speed of rotation of driven disk 33 increases as it descends, together with spindle 26, toward its lower dead-center position (dot-dash lines) in which it contacts the driving disk 29*a* or 29*b*** along a larger radius than in its elevated starting position (full lines).

The annular body 28 of disk 33 comprises an outer ring carrying a friction layer 45, this ring being connected with central part 40 by a thin, curved web 46 whose curvature in the vicinity of part 40 is substantially perpendicular to the generatrices of the frustoconical surface 47. This construction gives the disk 33 a maximum rigidity consistent with a minimum weight.

Thus, the driven disk embodying our invention constitutes a low-inertia coupling element of limited flywheel effect which is reversibly rotatable by associated driving disks with reference to which it can slip in the event of an overload. Naturally, the specific structures described and illustrated may be modified in various ways, readily apparent to persons skilled in the art, without departing from the spirit and scope of our invention as defined in the appended claims.

We claim:

1. In a spindle press having a spindle, a driven disk yieldably coupled with said spindle and rotatably about the axis thereof, and a pair of driving disks mounted on a shaft transverse to said axis for alternate frictional entrainment of said driven disk, the improvement wherein said driven disk comprises a hub with a frustoconical outer peripheral surface and a frustoconical bore, the generatrices of said surface and of said bore converging in the same direction, said spindle having a frustoconical head matingly received in said bore, said disk further comprising an annular body having a frustoconical inner peripheral surface complementary to said outer peripheral surface and in engagement therewith, there being further provided a pressure element and retaining means securing said element to said head under axial stress, said element bearing upon said body from the direction of the converging generatrices for maintaining said peripheral in frictional contact with each other.

2. The improvement defined in claim 1 wherein said retaining means comprises a tension rod passing axially through said spindle.

3. The improvement defined in claim 1 wherein said body is provided with an annular rib engaged under axial pressure by said element, the axial height of said rib being a small fraction of the axial extent of said hub.

4. The improvement defined in claim 1 wherein said body comprises a central part having a bore which forms said inner peripheral surface, an annular outer part with a cylindrical surface engageable by said driving disks, and a curved web interconnecting said parts, the curvature of said web in the vicinity of said central part being substantially perpendicular to the generatrices of said frustoconical peripheral surfaces.

References Cited

UNITED STATES PATENTS

| | | | |
|---|---|---|---|
| 1,299,301 | 4/1917 | Churchill | 287—52.06 XR |
| 1,449,849 | 3/1923 | Zeh | 74—194 |
| 2,051,998 | 8/1936 | Monroe | 287—52.06 XR |

C. J. HUSAR, *Primary Examiner.*

U.S. Cl. X.R.

100—289; 287—52.06